Dec. 7, 1965  J. W. LUCAS  3,222,102
VEHICLE COVER
Filed Sept. 13, 1963
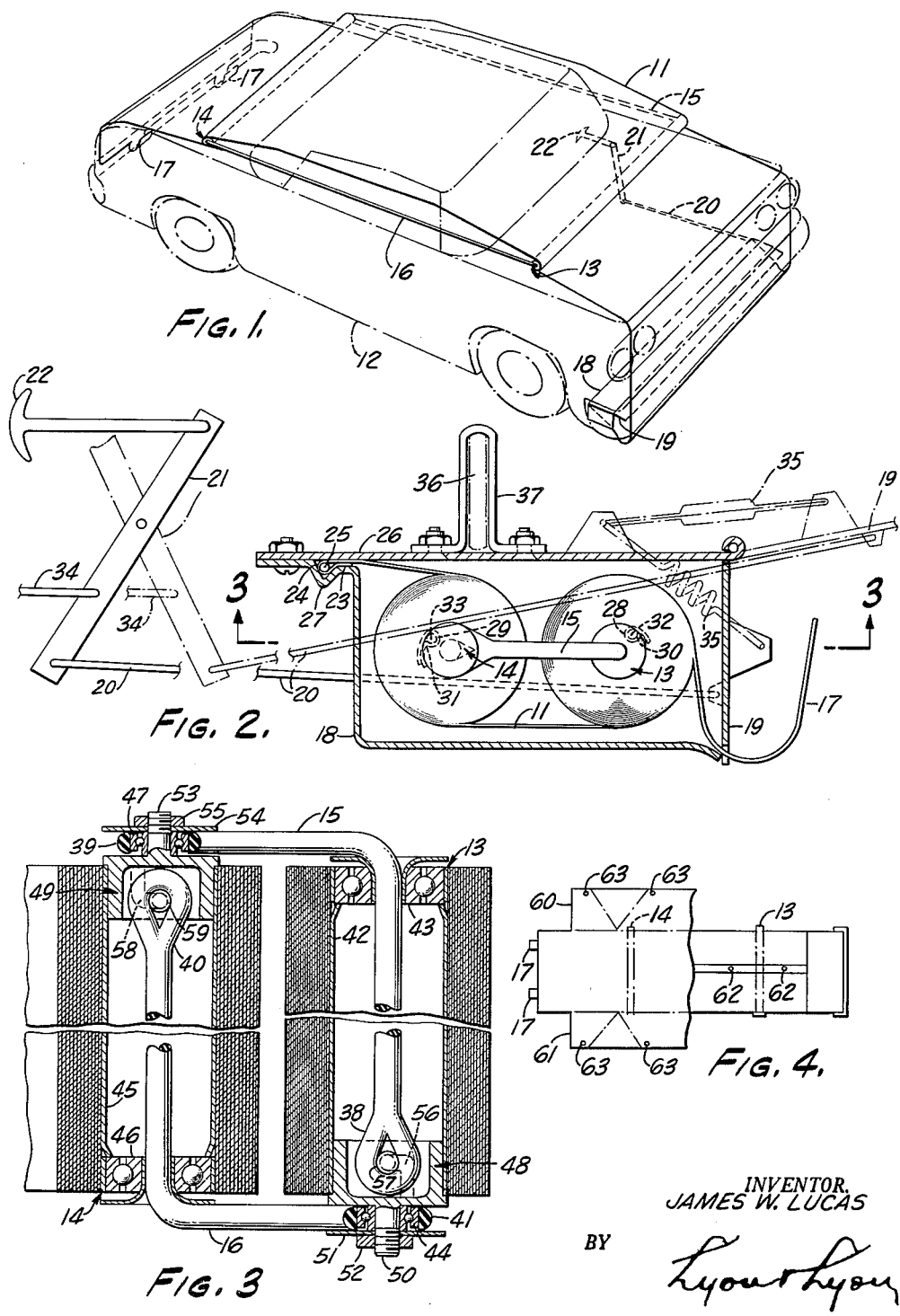
INVENTOR.
JAMES W. LUCAS
BY
Lyon & Lyon
ATTORNEYS

United States Patent Office

3,222,102
Patented Dec. 7, 1965

3,222,102
VEHICLE COVER
James W. Lucas, 1480 N. Doheny Drive,
Los Angeles 69, Calif.
Filed Sept. 13, 1963, Ser. No. 308,867
13 Claims. (Cl. 296—136)

The present invention relates to a vehicle cover and to an assembly adapted to carry and store said cover. More particularly, the present invention relates to a vehicle cover which is especially suited for use on automobiles.

A great number of vehicle covers have been devised over the years to satisfy particular requirements or to provide particular advantages. However, the great majority of these prior art covers are quite similar to each other and suffer from the same disadvantages. In general, prior art covers have comprised a single piece of fabric spirally wound on a roller which roller is mounted either at the front or rear of the vehicle. These rollers have usually been provided with a crank to assist in reeling and unreeling the cover. In most cases, a substantial amount of effort has been required to pull the cover over the vehicle to cover it and to return the cover to its mounting by cranking the roller. A more recent development has been a double roller cover which may be mounted at the center of the roof of the vehicle. While this structure does result in some reduction in the effort required to reel and unreel the cover, its position on the roof of the vehicle detracts from the overall appearance of the vehicle and prevents the roof space from being effectively usable for storage purposes.

Perhaps more important, all of the spirally wound vehicle covers of the prior art are subjected to the deficiency that the outer surface of the cover is brought into contact with the inner surface when they are wound on a roller. Thus, if the outer surface becomes soiled when the cover is in the unreeled position, this soiled outer portion is brought into contact with the inner surface when the cover is wound on the roller. Then in turn, when the cover is again unwound, the soiled inner surface of the cover is brought into contact with the surface of the vehicle. Thus, to a significant extent, these prior art covers are self-defeating to the extent that the inner surface is soiled by the outer surface when the cover is wound on the roller.

Other problems which have been encountered with prior art covers have included the tendency of these covers to become unwound while the vehicle is in motion which usually results in serious damage to the cover, theft of the cover from its mounting and the undesirably large vertical dimension of the storage means used for these covers. The present invention substantially obviates all of these problems and difficulties as well as providing additional significant advantages not found in prior art devices.

It is a primary object of the present invention to provide a vehicle cover which may be easily and simply removed from its storage container and caused to cover a vehicle.

It is another object of the present invention to provide a vehicle cover so constructed and arranged that its inner surface does not come in contact with its outer surface at any time during the use or storage thereof.

It is a further object of the present invention to provide a vehicle cover assembly which substantially prevents removal or escape of the vehicle cover from its storage container while the vehicle is in motion.

It is still another object of the present invention to provide a vehicle cover assembly which stores its own torsional energy whereby the effort required to store the cover in its container is substantially reduced.

Other objects and advantages of the present invention, it is believed, will become apparent from the following detailed description of specific embodiments thereof when read in connection with the accompanying drawings.

Briefly, the present invention comprises a vehicle cover, a portion of which is spirally wound on at least one roller. A plurality of rollers may be used in which case the cover may be wound in the same or opposite directions on the rollers. As will be described in greater detail herein, the cover is wound on the rollers in such a manner that an intermediate fold in the cover comprises the point of first contact on the roller. This method of winding the cover on the rollers causes the cover to be wound in such a manner that the inner surfaces thereof are adjacent to each other and the outer surfaces thereof are adjacent to each other whereby contact between the inner and outer surfaces is prevented. In the preferred embodiment of the present invention, the rollers are mounted on or provided with members capable of storing torsional energy whereby the rollers will aid in the rewinding of the cover due to the tendency of the rollers to rotate under the influence of the member capable of storing torsional energy. Preferably, the member capable of storing torsional energy comprises an elongated member of elastomeric or similar material which extends along the axis of one roller and is attached to one end of the other roller.

The cover of the present invention may be provided with side flaps which are so constructed that they may be folded on top of the principal portions of the cover. In addition, in a preferred embodiment of the present invention, the storage container for the cover of the present invention is connected to the emergency brake of the vehicle in such a manner that the container cannot be opened unless the emergency brake is applied. When this embodiment of the present invention is used, it is not possible for the vehicle to be moving when the storage container is open.

Referring now to the drawings, FIGURE 1 is a pictorial illustration of the cover of the present invention in the extended position.

FIGURE 2 is a schematic side view of the cover of the present invention in the wound position, the storage container for the cover and the connection of the storage cover to the emergency brake of the vehicle being shown.

FIGURE 3 is a bottom view of the cover of the present invention in the wound position taken on line 3—3 of FIGURE 2.

FIGURE 4 illustrates an embodiment of the present invention in which the cover is provided with side flaps.

Referring now to FIGURE 1, this figure illustrates the vehicle cover of the present invention which is indicated generally by numeral 11 in extended or covering position over vehicle 12. Cover 11 is mounted on rollers 13 and 14 which in turn are mounted on torsion members 15 and 16. Cover 11 is also provided with hooks 17 which are adapted to engage the rear bumper of the vehicle 12. As shown, rollers 13 and 14 are positioned such that they are suspended over the hood and trunk, respectively, of vehicle 12.

Also shown in FIGURE 1 is container 18 which is provided with lid 19. Lid 19 is connected to cable 20 which is attached to pivot lever 21 which is attached to emergency brake handle 22.

Referring now to FIGURE 2, cover 11 is shown in the wound or retracted position in container 18. As shown in this figure, fixed end 23 of cover 11 is provided with loop 24. Rod 25 is positioned in loop 24 and is securely held between wall 26 and protrusion 27 of container 18. At a point about 25% of the total length of the cover from each end, the cover is looped or folded upon itself as indicated by numerals 28 and 29. Loops 28 and 29 are positioned in grooves 30 and 31, respectively, which grooves are formed in rollers 13 and 14, respectively. Grooves 30 and 31 are provided with openings which extend along the lengths of rollers 13 and 14, respectively, which openings are substantially smaller than the diameters of grooves 30 and 31. Rods 32 and 33 are inserted in loops 28 and 29, respectively, to hold these loops in grooves 30 and 31.

It is apparent from FIGURE 2 that the cover 11 is wound on rollers 13 and 14 in spirals having opposite directions. Thus, when the free end of cover 11 which is provided with hooks 17 is withdrawn from container 18, each of these spirals will unwind such that rollers 13 and 14 are separated from each other as illustrated in FIGURE 1.

FIGURE 2 also illustrates in somewhat more detail the connection between lid 19, cable 20, lever 21 and brake handle 22. Cable 34 which is connected to the emergency brake (not shown) of vehicle 12 is also illustrated. As shown in this figure, when emergency brake handle 22 is released (as shown by the solid lines), lever 21 exerts tension on cable 20 which causes lid 19 to close. When emergency brake handle 22 is actuated to cause the emergency brake to be engaged, lever 21 releases the tension on cable 20 (as shown by the broken lines) such that lid 19 may be opened. Container 18 is also provided with spring 35 which functions as a toggle to hold the lid 19 in the open or closed position as desired. When the emergency brake is engaged, lid 19 is easily opened by pulling on hooks 17. The container 18 may be easily and securely fastened to the front bumper supports 36 of vehicle 12 by means of one or more clamps indicated by numeral 37.

FIGURE 3 illustrates a portion of the apparatus of the present invention taken on line 3—3 of FIGURE 2. As shown in FIGURE 3, means for storing torsional energy 15 and 16 comprise rods fabricated from an elastomeric material, e.g., rubber, which are provided with loops at each end. Thus, means 15 is provided with loops 38 and 39 while means 16 is provided with loops 40 and 41.

Roller 13 comprises tube 42 which is mounted for rotary motion on ball bearing assemblies 43 and 44. Similarly, roller 14 comprises tube 45 which is mounted on ball bearing assemblies 46 and 47. Roller 13 is provided with an end fitting indicated generally by numeral 48 which functions as a mounting for loops 38 and 41. Roller 14 is provided with end fitting 49 which functions as a mounting for loops 39 and 40. As shown, loop 41 is mounted on bearing 44 which is mounted on pin 50 and is held in place by washer 51 and nut 52. Similarly, loop 39 is mounted on bearing 47 which is mounted on pin 53 and is held in place by washer 54 and nut 55. Loop 38 is mounted on pin 57 which is engaged with bayonet slot 56 in roller 13 while loop 40 is mounted on pin 59 which is engaged with bayonet slot 58 in roller 14. End fittings 48 and 49 are held in tubes 42 and 45 by the tension and torsional force exerted through loops 38 and 40 and by the torsional force exerted by loops 39 and 41. The torsional force also functions to hold pins 57 and 59 in the bottom of bayonet slots 56 and 58, respectively.

In operation, when the free end of the cover 11 which is provided with hooks 17 is pulled from container 18, rollers 13 and 14 are caused to rotate, thereby twisting means 15 and 16 such that they store torsional energy. Furthermore, since means 15 and 16 are fabricated from elastomeric material, they are capable of being stretched as shown in FIGURE 1 such that the cover may be drawn over the entire length of the vehicle. When this is done, means 15 and 16 also serve as guides to facilitate proper unwinding and winding of the cover on rollers 13 and 14. Hooks 17, which may comprise a portion of the cover which has been stiffened with an epoxy resin or other similar material or which may comprise metallic or other members attached to the fabric cover are caused to engage the rear bumper of vehicle 12 to hold the cover in position. When it is desired to remove the cover, hooks 17 are pulled downwardly to release them from the bumper and walked back towards the front of the vehicle. This release of hooks 17 will permit the torsional energy stored in means 15 and 16 to cause rollers 13 and 14 to wind the cover 11 about their peripheries. The wound cover is then placed in container 18. After both rolls are in place, hooks 17 are guided up over lid 19 and brought into engagement therewith, whereby lid 19 is pulled shut leaving hooks 17 accessible as illustrated by the solid lines in FIGURE 2. As previously described, lid 19 is locked in the shut position by cable 20 when emergency brake handle 22 is released. Furthermore, if the operator forgets to close lid 19 by causing hooks 17 to come into engagement therewith, release of emergency brake handle 22 will cause the lid to close. Thus, the cover storage assembly of the present invention renders it impossible to cause the vehicle to move with lid 19 in the open position.

Referring now to FIGURE 4, the cover of the present invention may be provided with side flaps such as those indicated by numerals 60 and 61. These side flaps or panels are preferably one-half the width of rollers 13 and 14 and are preferably fabricated from the same piece of fabic as the principal portion of the cover such that there will not be a seam at the point of intersection of the side panels with the principal portion of the cover. However, if a seam is present, it is preferred that this seam be diagonal, thereby preventing excessive build-up of material on the seam when the cover is wound on the roller. The side flaps may be provided with fastening means such as snap means 62 to prevent these flaps from bunching up or otherwise interfering with uniform winding of the cover on rollers 13 and 14. If desired, the overlap caused by the use of snaps attached directly to the side panels may be avoided by using straps or similar means or by means of a slight bias in the edges such that the edges of the side panels do not overlap when they are folded on top of the principal portion of the cover. Furthermore, the outer edges of the side flaps may be provided with clips or other fastening means 63 which may be connected to neatly gather excess material and allow more attractive contouring of the cover.

Among the many advantages of the vehicle cover of the present invention is the fact that the double roller construction permits storing the cover in a container which has a vertical dimension substantially less than that which would be required if only a single roll construction were used. This is of particular advantage when the vehicle cover of the present invention is used for automobiles because of the very limited vertical space available beneath the bumpers of present day automobiles. It is preferred to mount the vehicle cover container of the present invention beneath the front bumper of most vehicles since this avoids any problem of interference with the exhaust mechanism of the vehicle which might occur as a result of a rear bumper mounting. However, it is to be understood that the vehicle cover of the present invention, could, if desired, be mounted at the front, rear, or any other portion of the vehicle.

The vehicle cover of the present invention may be fabricated from textile materials, synthetic polymers, glass fiber, or other suitable materials. Furthermore, the cover may comprise an elastic material or may have an elastic or memory material, e.g., springs or rubber, incorporated therein.

The means for storing torsional energy upon which the rollers of the cover assembly are mounted may be fabricated from materials other than elastomers. For example, an elongated spring could be used.

It will be readily apparent to those skilled in the art that the unique manner of winding the cover of the present invention which prevents the outer surface of the cover from coming into contact with the inner surface thereof is in itself inventive and could be combined with rollers not equipped with means for storing torsional energy. Furthermore, this cover could be stored in a container not provided with the unique and inventive locking and closing means of the present invention. However, it should also be understood that the combination of the cover of the present invention with the means capable of storing torsional energy produces unexpected and inventive results as does the combination of this assembly with the unique container means specifically described herein.

It will be readily apparent to those skilled in the art that the specific embodiments of the present invention which have previously been described may be modified considerably without departing from the scope of the invention. For example, rollers which are independently capable of storing torsional or return energy, e.g., in the manner of conventional window shades, and which are connected by a suitable linkage or other means such that they are capable of movement relative to each other. Furthermore, a single roller which is independently capable of storing torsional energy and which is capable of movement over the surface of the vehicle could be used. In each case, the cover should be so mounted such that one surface thereof will not come into contact with the other surface thereof. In this regard, it is pointed out that the cover need not comprise a single piece of material, but could comprise a plurality of pieces attached along one or more lines to the roller or rollers. For example, the cover shown in FIGURE 1 could comprise three pieces of material each joined to rollers 13 and 14 along different lines of attachment.

Although means for storing torsional energy have been specifically described as the means which are used to make the rollers capable of facilitating winding, it should be understood that other means, e.g., means for storing tension, could be used as the means for storing return energy. Similarly, means other than hooks, e.g., loops, straps, etc., could be used to render the cover capable of being secured in the extended position. Furthermore, rods 15 and 16 need not be attached to the ends of rollers 13 and 14, but could be joined at the centers of the rollers or elsewhere.

Having fully described the present invention, it is to be understood that it is not to be limited to the specific details set forth, but is of the full scope of the appended claims.

I claim:

1. A vehicle cover comprising a body having two ends, said body being folded upon itself along a first line intermediate said ends and along a second line intermediate said ends, each of said folded portions being substantially spirally wound towards a line intermediate said first line and said second line.

2. A vehicle cover having a length and two ends, said cover having a first portion folded upon itself along a line intermediate said ends and a second portion folded upon itself along a line intermediate said ends, said first folded portion being spirally wound in a clockwise direction towards a line substantially at the midpoint of said length and perpendicular to said length, said second folded portion being spirally wound in a counter-clockwise direction towards said line at the midpoint of said length.

3. A vehicle cover comprising a body having a length and two ends, said body being folded upon itself along a first line intermediate said ends and along a second line intermediate said ends, said first and said second lines each being spaced from one of said ends by a distance of about 25% of said length, each of said folded portions being substantially spirally wound towards a line intermediate said first line and said second line.

4. The cover of claim 3 wherein at least one of said ends is provided with a means for securing said cover in the extended position.

5. A vehicle cover assembly comprising a cover, a first roller, a second roller, and means capable of storing torsional energy connecting said first roller and said second roller, said cover being attached to said rollers along two lines separated from each other and intermediate the ends of said cover, said cover being folded upon itself along the lines of attachment to said rollers, each of said folded portions being capable of being substantially spirally wound toward a line intermediate said lines of attachment.

6. A vehicle cover assembly comprising a cover, a first roller, a second roller, and means for storing torsional energy connecting said first roller and said second roller, said means for storing torsional energy comprising a pair of rods fabricated from elastomeric material, one of said rods passing through said first roller and being connected to one end of said second roller, the other of said rods passing through said second roller and being connected to one end of said first roller, said cover being attached to said rollers along two lines separated from each other and intermediate the ends of said cover, said cover being folded upon itself along the lines of attachment to said rollers.

7. The assembly of claim 6 wherein each of said rods is provided with a loop at the ends theref, each of said rods being connected by one of said loops to one end of each of said rollers.

8. A vehicle cover assembly comprising a cover and a container, said cover having two ends and being folded upon itself along a first line intermediate said ends and along a second line intermediate said ends, each of said folded portions being substantially spirally wound toward a line intermediate said first line and said second line, said container comprising a body and a lid, said lid being adapted to be connected to the emergency brake mechanism of said vehicle whereby release of said emergency brake will cause said lid to be closed, wherein one end of said cover is attached to said container and the other end of said cover is provided with at least one hook, said cover and said container being so constructed and arranged that said hook is capable of extending through an opening defined by said lid and said container when said lid is in the closed position.

9. A vehicle cover assembly comprising a cover, a first roller, a second roller, means for storing torsional energy and a container, said cover being attached to said rollers along two lines separated from each other and intermediate the ends of said cover, said cover being folded upon itself along the lines of attachment to said rollers, said folded portions of said cover being capable of being spirally wound on said rollers toward a line intermediate said lines of attachment, said means for storing torsional energy being fabricated from an elastomeric material and being attached to one end of each of said rollers, said container being provided with a lid, one end of said cover being attached to said container and the other end of said cover being provided with a hook, said container and said cover being so constructed and arranged that said hook is capable of extending through an opening defined by said lid and said container when said lid is in the closed position.

10. The assembly of claim 9 wherein said lid is provided with means adapted to be connected to an emergency brake mechanism whereby release of said emergency brake will cause said lid to close.

11. In the combination comprising a vehicle and a vehicle cover, the improvement comprising a vehicle cover comprising a body having a first surface and a second surface, said body being spirally wound such that said first surface does not contact said second surface, said body being folded along a line parallel to the center line of the spiral winding.

12. In the combination comprising a vehicle and a vehicle cover, the improvement comprising a vehicle assembly comprising a cover, a first roller and a second roller, said cover being attached to said rollers along two lines separated from each other and intermediate the ends of said cover, said cover having a first surface and a second surface, said cover being attached to said rollers such that it is capable of being spirally wound on said rollers such that said first surface does not contact said second surface, said body being folded along a first line and a second line, said first line and said second line being parallel to the center line of the spiral winding on each of said rollers.

13. A vehicle cover assembly comprising a cover having a first surface and a second surface, a first roller, a second roller, and means for storing return energy comprising a flexible rod having one end attached to each of said rollers, said cover being folded along a first line and a second line, said first line being adjacent to said first roller and parallel to the center line thereof and said second line being adjacent to said second roller and parallel to the center line thereof, a portion of said cover being capable of being wound on said first roller and another portion of said cover being capable of being wound on said second roller so as to prevent said first surface from coming into contact with said second surface.

References Cited by the Examiner

UNITED STATES PATENTS

| | | | |
|---|---|---|---|
| 1,313,644 | 8/1919 | Simon | 297—388 |
| 1,925,815 | 9/1933 | Nicolson | 160—245 X |
| 1,999,171 | 4/1935 | Bryant. | |
| 2,151,249 | 3/1939 | Vidmar | 280—5 |
| 2,195,008 | 3/1940 | Lessmann | 242—55.16 |
| 2,276,279 | 3/1942 | Asklund | 180—69 |
| 2,472,915 | 6/1949 | Miller | 180—82 |
| 2,870,974 | 1/1959 | Clark | 242—55 |
| 2,942,794 | 6/1960 | Huso | 242—55 |
| 2,961,255 | 11/1960 | Trott | 280—150 |
| 3,042,425 | 7/1962 | Cathy et al. | 280—150 |

FOREIGN PATENTS

| | | |
|---|---|---|
| 473,572 | 10/1937 | Great Britain. |
| 1,189,774 | 10/1959 | France. |

BENJAMIN HERSH, *Primary Examiner.*

A. HARRY LEVY, *Examiner.*